United States Patent
Ohashi

(10) Patent No.: US 8,665,462 B2
(45) Date of Patent: Mar. 4, 2014

(54) PRINT INSTRUCTION APPARATUS AND PRINT INSTRUCTION PROGRAM

(75) Inventor: Hiroshi Ohashi, Hino (JP)

(73) Assignee: Konica Minolta Business Technologies, Inc. (JP)

( * ) Notice: Subject to any disclaimer, the term of this patent is extended or adjusted under 35 U.S.C. 154(b) by 68 days.

(21) Appl. No.: 13/335,796

(22) Filed: Dec. 22, 2011

(65) Prior Publication Data

US 2012/0170065 A1    Jul. 5, 2012

(30) Foreign Application Priority Data

Jan. 5, 2011  (JP) ................................. 2011-000667

(51) Int. Cl.
   *G06F 3/12*   (2006.01)
(52) U.S. Cl.
   USPC .......................... 358/1.13; 358/1.15; 358/1.14
(58) Field of Classification Search
   USPC ...................... 358/1.15, 1.13, 1.14
   See application file for complete search history.

(56) References Cited

U.S. PATENT DOCUMENTS

| 7,739,342 B2* | 6/2010 | Ono .............................. 709/206 |
| 2006/0087680 A1* | 4/2006 | Maeda ......................... 358/1.15 |
| 2009/0303515 A1* | 12/2009 | Imai ............................ 358/1.13 |
| 2010/0060929 A1* | 3/2010 | Koizumi ..................... 358/1.15 |

FOREIGN PATENT DOCUMENTS

JP    2009-146277    7/2009

* cited by examiner

*Primary Examiner* — Mark K Zimmerman
*Assistant Examiner* — Richa Mishra
(74) *Attorney, Agent, or Firm* — Squire Sanders (US) LLP

(57) ABSTRACT

Disclosed is a printer driver which acquires a file in which a printing condition has been stored, creates a print job based on the file, and instructs printing. The driver includes a first function which reads out the printing condition stored in the file, a second function which determines whether the file has been acquired from an external apparatus, and a third function which, (1) when it has been determined that the file has been acquired from an external apparatus, (1-1) checks with a user whether to change the printing condition, (1-2) displays a screen for setting the printing condition, or (1-3) sets a default printing condition in the print job, and (2) when it has been determined that the file has not been acquired from an external apparatus, sets in the print job, the printing condition stored in the file as the printing condition for the file.

10 Claims, 4 Drawing Sheets

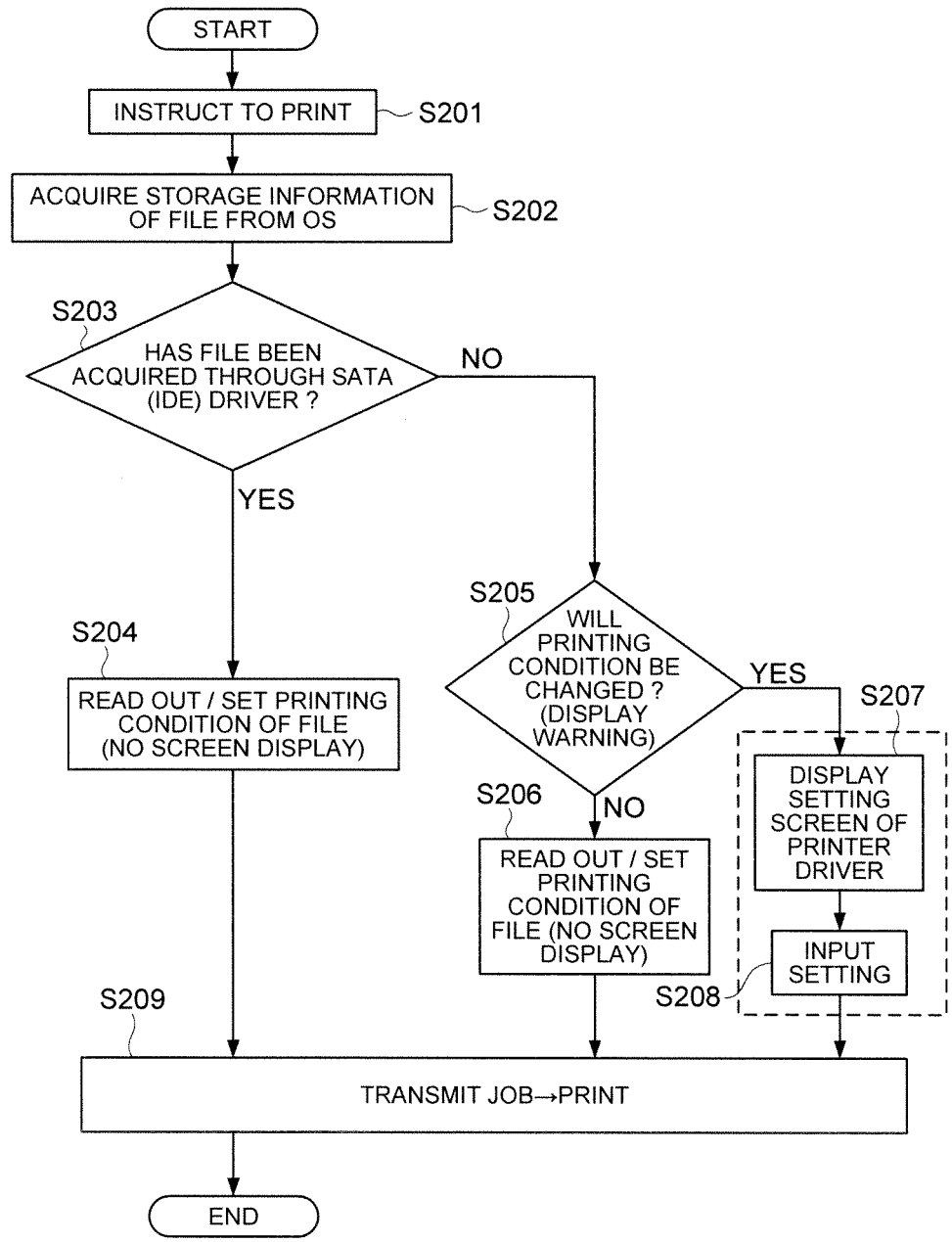

PRINT INSTRUCTION APPARATUS AND PRINT INSTRUCTION PROGRAM

This application is based on Japanese Patent Application No. 2011-000667 filed on Jan. 5, 2011 with Japanese Patent Office, the entire content of which is hereby incorporated by reference.

BACKGROUND OF THE INVENTION

The present invention relates to a print instruction apparatus that gives an instruction to print a file and a print instruction program that works therein.

In recent years, there has been a widespread use of printing apparatuses (hereinafter referred to as "image forming apparatuses") such as printers and digital multi-functional peripherals (MFP). When the image forming apparatus is used to perform printing as a network printer, a file of document is converted into a printing job in the form of Page Description Language (PDL) by using software (printer driver) for controlling the image forming apparatus, after the file is created or is acquired from an external device by using an application program installed in a computer apparatus that is connected with a network. Then the file is sent to the image forming apparatus, which analyzes the print job to generate intermediate data, and converts it into image data in the bitmap form to output the same onto a paper medium.

The printing conditions such as the number of copies to be printed, etc., are usually set using a setting screen of the printer driver, and, when a file prepared using an application program such as Microsoft Excel (registered trademark) is printed, those printing conditions are stored in that file. Because of this, at the time of printing such a file again, unless the printing conditions are set on the setting screen of the printer driver, sometimes the printing of unintended number of copies may be done since the printing conditions stored in the file are set for the print job.

Regarding the setting of such printing conditions, a technology has been disclosed in Unexamined Japanese Patent Application Publication No. 2009-146277 of comparing the setting date and time of the print settings (the first print settings) made in the document property with the date and time of starting the application program that has given the print instruction, and of changing the print settings to the settings of the driver (the second print settings) when date and time of the print settings is older than the date and time of the starting, thereby preventing the problem of printing being made with the print settings that were made earlier.

Here, although the number of copies to be printed varies depending on the user, frequently the same user carries out printing of the same number of copies. Therefore, when a file that the same user has previously printed is printed again, it is desirable that the print settings made previously are reflected in the current printing. However on the other hand, when printing again a file that was printed by someone else, it is desirable that the print settings made previously are not reflected in the current printing.

However, conventionally, irrespective of whether or not the same user was giving the print instruction, since the control was being carried out either printing according to the printing conditions stored in the file, or else, as in Unexamined Japanese Patent Application Publication No. 2009-146277, printing according to the printing conditions set in the printer driver by making the printing conditions stored in the file invalid, there was the problem that the convenience to the user was poor, and that it was not possible to prevent wasteful printing effectively.

SUMMARY

The present invention was made with the above problem in view, and one of the main purposes of the present invention is to provide a print instruction apparatus and a print instruction program which can prevent wasteful printing effectively, even when printing a file in which printing conditions have been stored.

To achieve at least one of the abovementioned objects, a print instruction apparatus reflecting one aspect of the present invention is as follows.

1. A print instruction apparatus which acquires a file in which a printing condition has been stored, and instructs printing by creating a print job based on the file, with the print instruction apparatus including: a printing condition reading section which reads out the printing condition stored in the file; a file determining section which determines whether the file is a file which has been acquired from an external apparatus; and a printing condition setting section which, (1) when the file determining section has determined that the file is the file which has been acquired from an external apparatus, (1-1) checks with a user whether to change the printing condition, (1-2) displays a screen for setting the printing condition, or (1-3) sets a default printing condition in the print job, and (2) when the file determining section has determined that the file is not the file which has been acquired from an external apparatus, sets in the print job, the printing condition stored in the file as the printing condition for the file.

2. The print instruction apparatus of the above item 1, wherein the file determining section determines that the file is the file which has been acquired from an external apparatus when the file is a file which has been acquired via a driver for a network.

3. The print instruction apparatus of the above item 1, wherein the file determining section determines that the file is the file which has been acquired from an external apparatus when the file is a file which has been acquired from a specific folder for storing a file attached to an email.

4. The print instruction apparatus of the above item 1, wherein the file determining section determines that the file is the file which has been acquired from an external apparatus when the file is a file which has been acquired via a driver for a portable recording medium.

5. The print instruction apparatus of the above item 1, wherein the file determining section determines that the file is not the file which has been acquired from an external apparatus when the file is a file which has been acquired via a driver for an internal HDD.

BRIEF DESCRIPTION OF THE DRAWINGS

FIG. 5 is a flow chart showing the detailed operations of a printer driver (the operations when determining that the file is one that has been acquired from inside the apparatus) according to a preferred embodiment of the present invention.

DETAILED DESCRIPTION OF THE PREFERRED EMBODIMENT

Figure 1:
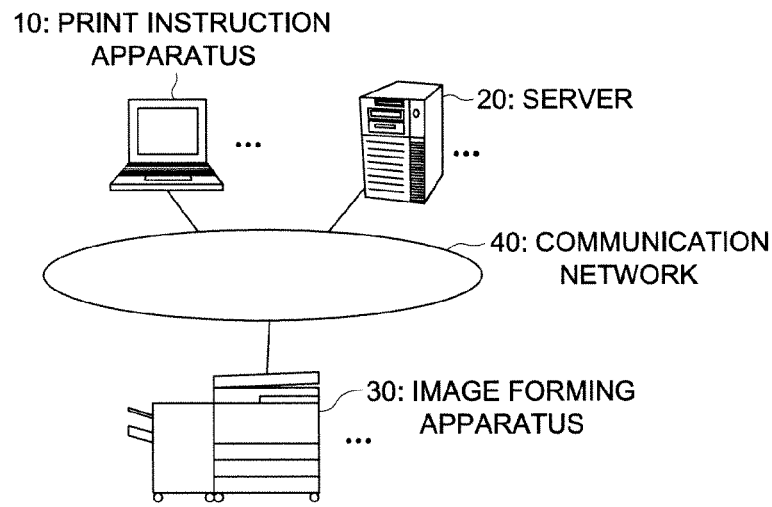
FIG. 1 is a diagram showing schematically the configuration of a printing system according to a preferred embodiment of the present invention.

Further, another preferred embodiment of the present invention is a print instruction program operating in a print instruction apparatus that acquires a file in which the printing conditions have been stored, creates a print job based on that file, and instructs printing, which makes said apparatus function as a printing condition reading section that reads out the printing conditions stored in said file, a file determining section that determines whether said file is a file that has been acquired from an external apparatus, and a printing condition setting section that, when it has been determined that the file is one that has been acquired from an external apparatus, checks with the user whether to change the printing conditions, or displays a screen for setting the printing conditions, or sets default printing conditions in said print job.

In the preferred embodiment of the present invention, said file determining section can determine that a file has been acquired from an external apparatus when said file is a file that has been acquired via a driver for a network, or when said file is a file that has been acquired from a specific folder for storing files attached to emails, or when said file is a file that has been acquired via a driver for portable recording media.

Further, in the preferred embodiment of the present invention, said file determining section can determine that a file has not been acquired from an external apparatus when said file is a file that has been acquired via a driver for a built-in HDD.

As was indicated in the Background of the Invention, in the case of a file prepared by an application program such as Microsoft Excel (registered trademark) or the like, since the printing conditions are stored in that file when a printing is executed (for example, the printing conditions are written in the file header or the like), at the time of printing again a file that had previously been printed, unless the printing conditions are set on the setting screen of the printer driver, the printing conditions stored in the file are set in the print job, and there are times when the printing of unintended number of copies is done.

Here, if printing in a company is considered, when a member of a group carries out printing it is common that only one copy is printed out for one's own use, and when a manager of a group carries out printing, it is common that the printing of a number of copies including the number of other members in that group is done. Thus, although the number of copies is different depending on the user, it is considered that frequently the same user prints the same number of copies. For this reason, when a user prints a file which that user has printed before, it is convenient that the printing conditions set previously are reflected, and on the other hand, when printing again a file that was printed previously by another person, it is preferable that the printing conditions set previously are not reflected.

However, conventionally, irrespective of whether or not the same user gave the print instruction, since the printing conditions stored in the file were simply treated as either valid or invalid one, in the control of making the printing conditions stored in the file invalid without considering the user, the convenience to the user was poor, and in the control of making the printing conditions stored in the file valid without considering the user, it was not possible to prevent wasteful printing effectively.

Consequently, when printing a print target file in which its printing conditions have been stored, although it is preferable to determine whether to make the printing conditions stored in that file valid or invalid based on whether that file is one that was printed by oneself or by another user, usually, since information identifying the user who printed the file is not stored in the file, it is difficult to determine whether the user who printed the file previously is the user currently instructing the printing.

On the other hand, usually, a file that was prepared by oneself in a computer apparatus is frequently stored inside that computer apparatus, and a file prepared by another user is frequently acquired from a server or another computer or the like via a network, or is acquired as a file attached to an email, or is acquired via a portable recording medium such as a USB (Universal Serial Bus) memory or an SD (Secure Digital) card.

Therefore, in a preferred embodiment of the present invention, at the time of instructing the printing of a file in which the printing conditions of that file have been stored, whether that file is one that has been acquired from an external apparatus (for example, whether acquired via a network driver or via a USB (SD card) driver, or is a file that was attached to an email, etc.) is determined, and when it is determined that the file was acquired from an external apparatus, it is determined that the probability that the printing conditions stored in that file were set by another user is high, and therefore the user may be asked whether or not the printing conditions are to be changed, or a screen for setting the printing conditions may be displayed, or default printing conditions may be set. On the other hand, whether the target file of printing has been acquired from inside that apparatus (for example, a file acquired via a SATA (IDE) driver, etc.) is determined, and when it is determined that the file was acquired from inside that apparatus, it is determined that the probability that the printing conditions stored in that file were set by that user is high, and the printing conditions in that file are set as the printing conditions in the print job.

In this manner, by judging the user who has set the printing conditions stored in the printing target file based on whether that file was one acquired from an external apparatus (or a file that was acquired from inside that apparatus), when printing again a file that was printed previously by that user, the printing conditions that were set previously can be reflected, and when printing again a file that was printed previously by another user, the previously set printing conditions can be prevented from being reflected automatically, and because of this, the convenience of the user can be increased, and also, wasteful printing can be prevented effectively.

EXAMPLES

Figure 2:
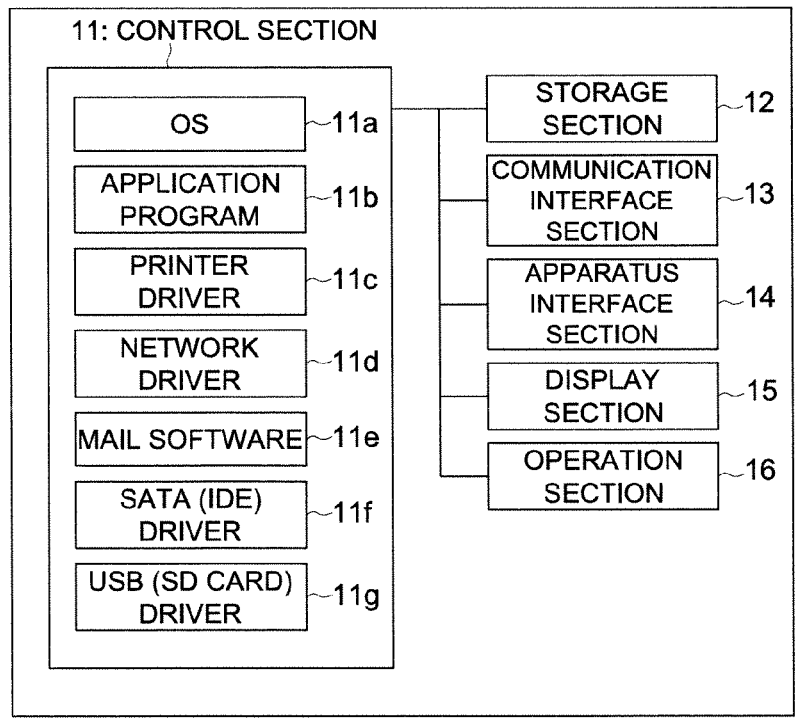
FIG. 2 is a block diagram showing the configuration of a print instruction apparatus according to a preferred embodiment of the present invention.
Figure 3:
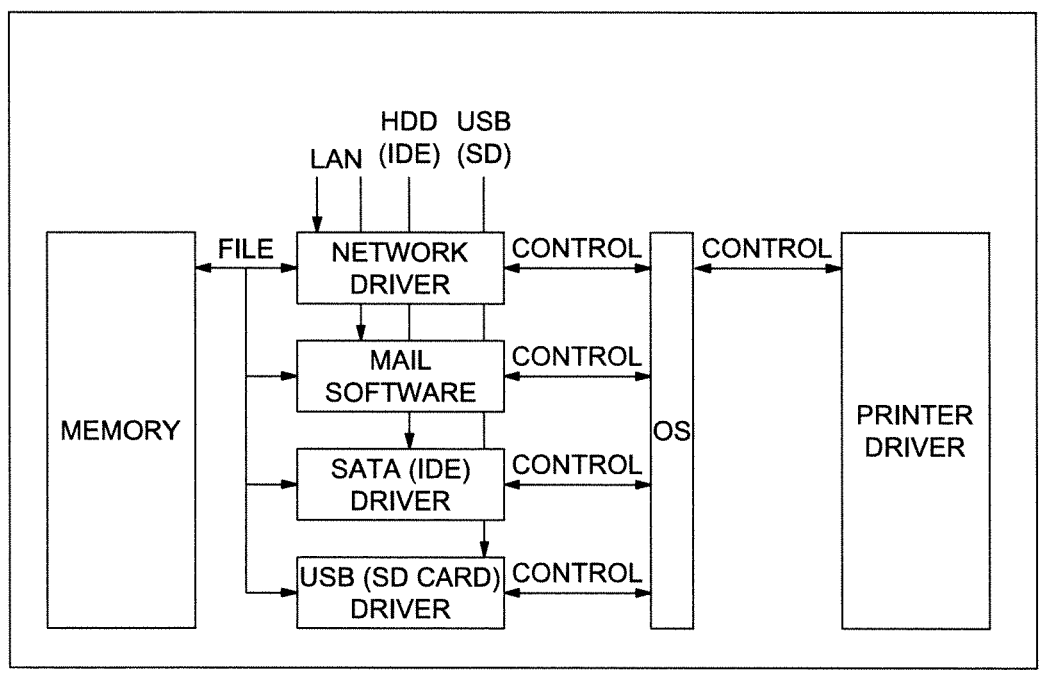
FIG. 3 is a diagram showing schematically the outline operations of the control section of the print instruction apparatus according to a preferred embodiment of the present invention.
Figure 4:
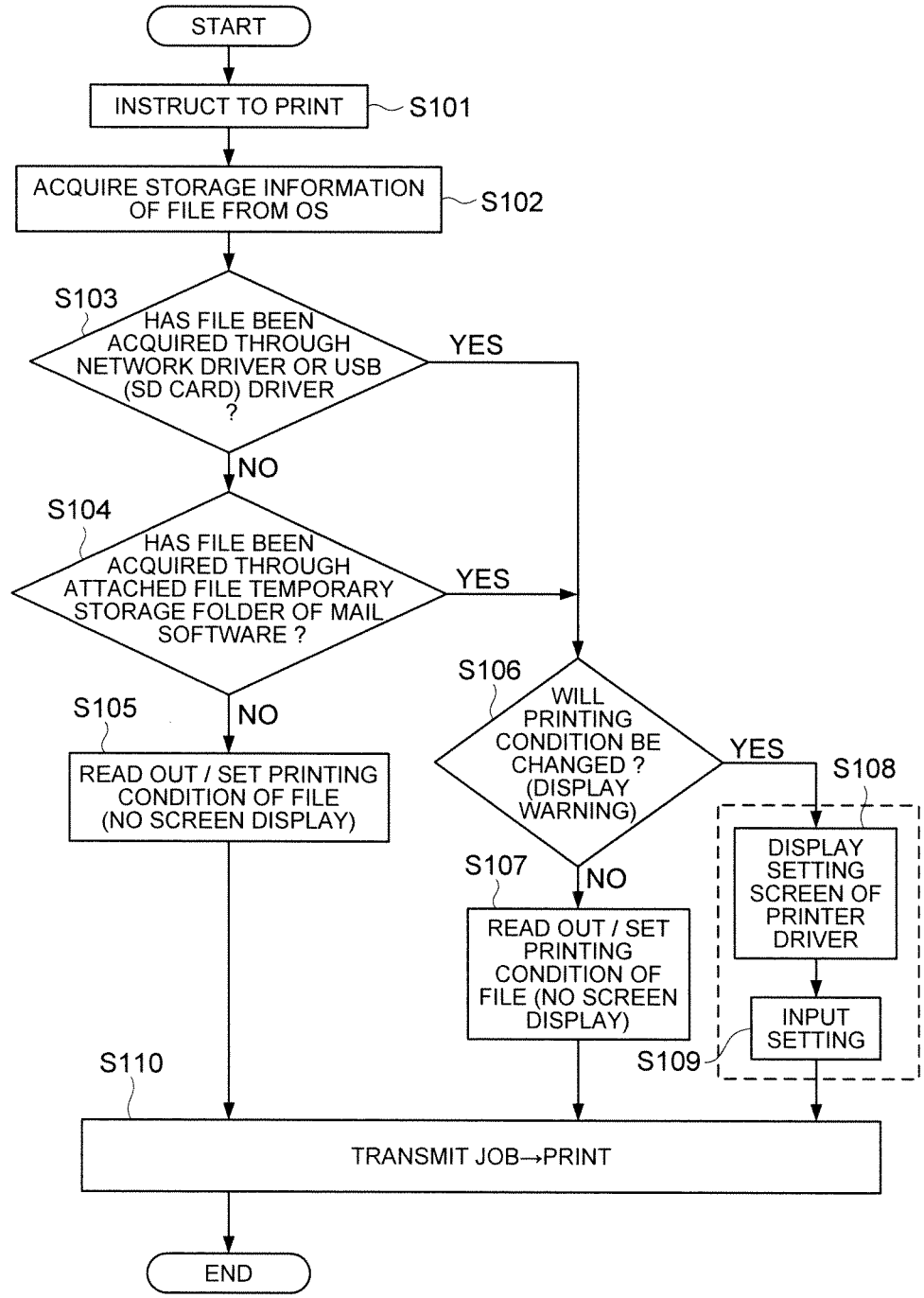
FIG. 4 is a flow chart showing the detailed operations of a printer driver (the operations when determining that the file is one that has been acquired from an external apparatus) according to a preferred embodiment of the present invention.

In order to describe in further detail a preferred embodiment of the present invention described above, regarding a print instruction apparatus and a print instruction program according to a preferred embodiment of the present invention, explanations are given here with reference to FIGS. 1 to 5. FIG. 1 is a diagram showing schematically the configuration of a printing system according to the present preferred embodiment, and FIG. 2 is a block diagram showing the configuration of a print instruction apparatus according to the present preferred embodiment. Further, FIG. 3 is a diagram showing schematically the outline operations of the control section of the print instruction apparatus according to the present preferred embodiment, and FIGS. 4 and 5 are flow charts showing the detailed operations of a printer driver according to the present preferred embodiment.

As is shown in FIG. 1, a printing system according to the present preferred embodiment is configured to have a print instruction apparatus 10 such as a computer apparatus that instructs printing by transmitting a print job, a server or a computer apparatus that stores the file that is the target of printing or transmits the file as an attachment to an email, etc. (this is called a server 20 in the present preferred embodiment), and an image forming apparatus 30 such as a printer or a multifunction peripheral unit that receives and executes the print job. These are connected to each other by a communication network 40 such as a LAN (Local Area Network) or a WAN (Wide Area Network) that are stipulated by standards such as Ethernet, token ring, and FDDI (Fiber-Distributed Data Interface).

The above print instruction apparatus 10, as is shown in FIG. 2, is configured to have a control section 11, a storage section 12, a communication interface section 13, an apparatus interface section 14, a display section 15, and an operation section 16, and others.

The control section 11 is configured to have a CPU (Central Processing Unit) and memory such as a ROM (Read Only Memory) and a RAM (Random Access Memory). The CPU reads programs for controlling the operation of the print instruction apparatus 10, an OS (Operating System) 11a, an application program 11b, a printer driver 11c, a network driver 11d, mail software 11e, a SATA (Serial ATA) driver (IDE (Integrated Device Electronics) driver) 11f, a USB (SD Card) driver 11g, etc. from the ROM or from the storage section 12, and executes it after loading it in the RAM.

The OS 11a is Windows (registered trademark), MAC OS (registered trademark), Linux (registered trademark), or the like, and carries out the respective controls of the application program 11b, the printer driver 11c, the network driver 11d, the mail software 11e, the SATA (IDE) driver 11f, the USB (SD Card) driver 11g, or the like, and provides the information of which driver was used for storing the file and in which areas of the memory or the storage section 12 the file is stored (this is called file storage information) to the printer driver 11c.

The application program 11b can be Excel (registered trademark), etc., and prepares the file which is to be the target of printing.

The printer driver 11c has the function of controlling the print instruction apparatus 10, the function of acquiring file storage information via the OS 11a, and the function of converting a file prepared by an application program 11b or a file stored in the memory or in the storage section 12 into a language (a PDL such as PCL (Printer Control Language) or PS (Post Script)) that can be interpreted by the image forming apparatus 30, and preparing a print job by adding the printing conditions to it, and of instructing printing. Further, the printer driver 11c also functions as a printing condition reading section that reads out the printing conditions stored inside the file that is the target of printing, as a file determining section that determines whether the file that is the target of printing is a file that was acquired from an external apparatus (or else, whether that file was acquired from inside the apparatus), and as a printing condition setting section that, when it has been determined that the file is one that was acquired from an external apparatus, checks with the user whether to change the printing conditions, set the default printing conditions, or else, displays a screen for setting the printing conditions, and when it has been determined that the file is not one that was acquired from an external apparatus, sets the printing conditions stored in that file as the printing conditions for that file.

The network driver 11d is a driver for inputting and outputting a file via the network 40.

The mail software 11e is software that receives emails via the network 40, and stores the files attached to emails in a temporary folder determined in advance.

The SATA (IDE) driver 11f is a driver for inputting and outputting a file to and from the storage section 12 or an internal memory.

The USB (SD Card) driver 11g is a driver for inputting and outputting a file to and from portable recording medium such as a USB memory and an SD card.

The storage section 12 is configured with an HDD (Hard Disk Drive), or the like, that is built in the print instruction apparatus 10, and stores programs and files, etc.

The communication interface section 13 is configured with an NIC (Network Interface Card) or a modem or the like, and makes it possible to carry out communication with a server, a computer apparatus, and the image forming apparatus 30 via the communication network 40.

The apparatus interface section 14 is configured with a USB port or SD card slot, and make it possible to communicate with portable recording media such as a USB memory and an SD card.

The display section 15 is configured with a liquid crystal display (LCD) device, an organic EL (Electroluminescence) display device, or the like, and displays a setting screen for setting the printing conditions, etc.

The operation section 16 is configured with a mouse, a keyboard, or others, and makes it possible to carry out operations such as preparation of documents using the application program 11b, setting the printing conditions and giving the print instruction using the printer driver 11c, etc.

Further, FIG. 1 and FIG. 2 are examples, and the configuration of the printing system, the print instruction apparatus 10, the server 20, or the image forming apparatus 30 can be modified suitably. For example, in FIG. 1, although the printing system is configured using a print instruction apparatus 10, a server 20, and an image forming apparatus 30, it is possible, in addition to these, to connect a control device such as an RIP (Raster Image Processor) controller to the communication network 40, and to make the control device have the functions of the printing condition reading section, the file determining section, and the printing condition setting section of the printer driver 11c. Further, when acquiring the file that is the target of printing from a portable recording medium, it is also possible to omit the server 20. Further, in the present preferred embodiment, although a USB memory and a SD card are given as examples of portable recording media, the external HDD or CF (Compact Flash (registered trademark)), memory stick, CD (Compact Disc), DVD (Digital Versatile Disk), etc. can be used.

Next, the outline operations of the control section 11 of the print instruction apparatus 10 of the above configuration are described with reference to FIG. 3.

FIG. 3 shows the operations between the elements related to the control in the present preferred embodiment, and when the network driver 11d controlled by the OS 11a acquires a file from the communication network 40 via the communication interface section 13, the acquired file is made to be stored in the memory. Further, when the mail software lie controlled by the OS 11a acquires an email from the communication network 40 via the communication interface section 13, the file attached to the received email is made to be stored in a temporary storage folder of the memory. Further, when the SATA (IDE) driver 11f controlled by the OS 11a acquires a file from the storage section 12 (built-in HDD), the acquired file is made to be stored in the memory. Also, when the USB (SD Card) driver 11g controlled by the OS 11a acquires a file from an USB memory or an SD card via the apparatus interface section 14, the acquired file is made to be stored in the memory. Next, the OS 11a recognizes via which driver or software the file in the memory has been stored, and hands over the file storage information to the printer driver 11c.

The printer driver 11c acquires the file storage information from the OS 11a and, based on that storage information, carries out the controls of, when the file that is the target of printing was stored via the network driver 11d or the USB (SD Card) driver 11g, or else, was stored in a temporary storage folder specified by the mail software 11e, checking with the user whether or not to change the printing conditions, or displaying the setting screen for setting the printing conditions, or setting the default printing conditions; and when the file that is the target of printing was stored via the SATA (IDE) driver 11f, it carries out the control of setting in the print job, the printing conditions stored inside file as the printing conditions.

Next, the detailed operations of the print instruction apparatus 10 (printer driver 11c) of the present preferred embodiment are described with reference to the flow chart of FIG. 4.

To begin with, when a document is opened using the application program 11b and printing is instructed by following the usual flow for printing (S101), the printer driver 11c acquires the file storage information from the OS 11a (S102).

Next, the printer driver 11c, using the file storage information, determines whether the file has been acquired via the network driver 11d or the USB (SD Card) driver 11g (S103), and if the file has not been acquired via the network driver 11d or the USB (SD Card) driver 11g, it determines whether the file has been acquired from the temporary storage folder for attached files of the mail software 11e (S104).

When the file has not been acquired from the temporary storage folder for attached files of the mail software 11e, since it can be considered that the probability is high that the printing conditions stored inside the file were set by the user that has given an instruction to print, the printing conditions stored inside the file are read out, and these printing conditions are set as the printing conditions for that file (S105).

On the other hand, if the file is one that has been acquired via the network driver 11d, or the USB (SD Card) driver 11g, or the temporary storage folder for attached files of the mail software 11e, since it can be considered that the probability is high that the printing conditions stored inside the file were set by some other user, a warning is given to the user, for asking whether or not to change the printing conditions (S106).

Next, if the printing conditions are not to be changed, the printing conditions stored inside the file are read out, these printing conditions are set as the printing conditions for that file (S107), and if the printing conditions are to be changed, the printer driver 11c displays the setting screen in the display section 15 (S108), and asks the user to input the settings for the printing conditions (S109). Further, although the configuration here was that in which the setting screen is displayed after confirming whether or not to change the printing conditions, it is also possible to have a configuration in which the setting screen is displayed immediately without asking whether or not to change the printing settings. Also, although the configuration here was that in which the setting screen is displayed when the printing conditions are to be changed, it is also possible to have a configuration in which, instead of displaying the setting screen, the printing conditions are replaced with the default settings.

After that, the printer driver 11c sets in the print job, the printing conditions stored inside the file, or the printing conditions input by the user as settings, or the default printing conditions, and instructs printing by transmitting that print job to the image forming apparatus 30 (S110).

In this manner, if the file has been acquired via the network driver 11d, or the USB (SD Card) driver 11g, or the mail software 11e, since control is carried out of determining that the probability is high that the printing conditions stored inside the file were set by some other user, and asking the user whether or not to change the printing conditions, or displaying the setting screen for the printing conditions, or setting the default printing conditions, wasteful printing can be prevented effectively.

While the above flow is the processing when determining whether the file that is the target of printing is a file that has been acquired from an external apparatus, it is also possible to determine whether the file that is the target of printing is a file that has been acquired from inside the apparatus. The detailed operations of the print instruction apparatus 10 (the printer driver 11c) in this case are described here with reference to the flow chart of FIG. 5.

To begin with, when a document is opened using the application program 11b and printing is instructed following the usual flow for printing (S201), the printer driver 11c acquires the file storage information from the OS 11a (S202), and using the file storage information, determines whether the file has been acquired via the SATA (IDE) driver 11f (S203).

If the file has been acquired via the SATA (IDE) driver 11f, since it can be considered that the probability is high that the printing conditions stored inside the file were set by the user that has given an instruction to print, the printing settings stored inside the file are read out and are set as the printing settings for that file (S204).

On the other hand, if the file is not one which has been acquired via the SATA (IDE) driver 11f, since it can be considered that the probability is high that the printing conditions stored inside the file were set by some other user, a warning is given to the user, for asking whether or not to change the printing conditions (S205).

Next, if the printing conditions are not to be changed, the printing conditions stored inside the file are read out, these printing conditions are set as the printing conditions for that file (S206), and if the printing conditions are to be changed, the printer driver 11c displays the setting screen in the display section 15 (S207), and asks the user to input the settings for the printing conditions (S208). Further, similar to that described above, it is also possible to have a configuration in which the setting screen is displayed immediately without asking whether or not to change the printing settings, or to have a configuration in which, instead of displaying the setting screen, the printing conditions are replaced with the default settings.

After that, the printer driver 11c sets in the print job, the printing conditions stored inside the file, or the printing conditions input by the user as settings, or the default printing conditions, and instructs printing by transmitting that print job to the image forming apparatus 30 (S209).

In this manner, if the file has been acquired via the SATA (IDE) driver 11f, since control is carried out of determining that the probability is high that the printing conditions stored inside the file were set by the same user that has given an instruction to print, and setting those printing conditions in the print job, it is possible to eliminate the tediousness of the same user having to set the printing conditions many times, thereby enhancing the convenience to the user.

Further, the present invention shall not be restricted to the above preferred embodiments, and it shall be possible to make suitable modifications in its configuration and control without deviating from the spirit of the present invention.

For example, in the above preferred embodiment, it was determined that the file was acquired from an external apparatus when it was acquired via the network driver 11d, or via the USB (SD Card) driver 11g, or via the mail software 11e, and also it was determined that the file was acquired from inside the apparatus when it was acquired via the SATA (IDE) driver 11f. However, it is also possible to determine that the file was acquired from an external apparatus even if it was acquired via the SATA (IDE) driver 11f, if that is a file that had been stored in the internal HDD via the network driver 11d, or via the USB (SD Card) driver 11g, or via the mail software 11e.

The present invention can be utilized for the print instruction apparatuses that give print instructions to image forming apparatuses and for print instruction programs such as the printer drivers that operate in such print instruction apparatuses.

According to the print instruction apparatus and print instruction program which are preferred embodiments of the present invention, even when printing a file in which its printing conditions have been stored, wasteful printing can be prevented effectively.

The reason for this is that, the print instruction apparatus (the print instruction program) determines whether or not the file that is the target of printing and has the printing conditions stored inside has been acquired from an external apparatus, and if it is determined that the file has been acquired from an external apparatus, it is determined that the probability is high that the printing conditions stored in that file were set by some other user, and control is carried out of asking the user whether or not to change the printing conditions, or displaying the setting screen for the printing conditions, or setting the default printing conditions.

Further, if it is determined that the file was acquired from inside the apparatus, since it is determined that the probability is high that the printing conditions stored inside the file were set by the user that has given an instruction to print, and control is carried out of setting in the print job, those printing conditions stored in the file as the printing conditions for that file.

What is claimed is:

1. A print instruction apparatus which acquires a file in which a printing condition has been stored, and instructs printing by creating a print job based on the file, the print instruction apparatus comprising:
a printing condition reading section which reads out the printing condition stored in the file;
a file determining section which is configured to differentiate between whether the file is a file which has been acquired from an external apparatus and whether he file is a file which has been acquired from inside the apparatus and to determine if the file is from the external apparatus or from inside the apparatus; and
a printing condition setting section which,
(1) when the file determining section has determined that the file is the file which has been acquired from an external apparatus, then at least one of the following occurs: (1-1) checks with a user whether to change the printing condition, (1-2) displays a screen for setting the printing condition. or (1-3) sets a default printing condition in the print job, and
(2) when the file determining section has determined that the file is a file which has been acquired from inside the apparatus and not the file which has been acquired from an external apparatus, sets in the print job the printing condition stored in the file as the printing condition for the file.

2. The print instruction apparatus of claim 1,
wherein the file determining section determines that the file is the file which has been acquired from an external apparatus when the file is a file which has been acquired via a driver for a network.

3. The print instruction apparatus of claim 1,
wherein the file determining section determines that the file is the file which has been acquired from an external apparatus when the file is a file which has been acquired from a specific folder for storing a file attached to an email.

4. The print instruction apparatus of claim 1,
wherein the file determining section determines that the file is the file which has been acquired from an external apparatus when the file is a file which has been acquired via a driver for a portable recording medium.

5. The print instruction apparatus of claim 1,
wherein the file determining section determines that the file is not the file which has been acquired from an external apparatus when the file is a file which has been acquired via a driver for an internal HDD.

6. A non-transitory computer-readable recording medium storing a print instruction program to be executed in an apparatus which acquires a file in which a printing condition has been stored, and instructs printing by creating a print job based on the file, the print instruction program allowing the apparatus to function as:
a printing condition reading section which reads out the printing condition stored in the file;
a file determining section which is configured to differentiate between whether the file is utile which has been acquired from an external apparatus and whether the file is a file which has been acquired from inside the apparatus and to determine if the file is from the external apparatus or from inside the apparatus ; and
a printing condition setting section which,
(a) when the file determining section has determined that the file is the file which has been acquired from an external apparatus, then conducts at least one of the following: checks with a user whether to change the printing condition, displays a screen for setting the printing condition, or sets the printing condition to a default, and
(b) when the file determining section has determined that the file is a file which has been acquired from inside the apparatus and not the file which has been acquired from an external apparatus, sets in the print job the printing condition stored in the file as the printing condition for the file.

7. The non-transitory computer-readable recording medium of claim 6,
wherein the file determining section determines that the file is the file which has been acquired from an external apparatus when the file is a file which has been acquired via a driver for a network.

8. The non-transitory computer-readable recording medium of claim 6,
wherein the tile determining section determines that the file is the file which has been acquired from an external apparatus when the file is a file which has been acquired from a specific folder for storing a file attached to an email.

9. The non-transitory computer-readable recording medium of claim 6,
   wherein the file determining section determines that the file is the file which has been acquired from an external apparatus when the file is a file which has been acquired via a driver for a portable recording medium.

10. The non-transitory computer-readable recording medium of claim 6,
   wherein the file determining section determines that the file is not the file which has been acquired from an external apparatus when the file is a file which has been acquired via a driver for an internal HDD.

\* \* \* \* \*